(12) United States Patent
McNeill et al.

(10) Patent No.: US 9,157,568 B2
(45) Date of Patent: Oct. 13, 2015

(54) HEIGHT ADJUSTABLE SUPPORTS WITH THE CAPACITY FOR MULTIPLE ORIENTATIONS FOR USE WITH TABLETOPS, CHAIR SEATS AND SIMILAR SURFACES

(71) Applicants: Donald McNeill, Redding, CT (US); Jay Krause, Philipsburg, PA (US)

(72) Inventors: Donald McNeill, Redding, CT (US); Jay Krause, Philipsburg, PA (US)

(73) Assignee: Donald McNeill, Redding, CT (US)

(*) Notice: Subject to any disclaimer, the term of this patent is extended or adjusted under 35 U.S.C. 154(b) by 0 days.

(21) Appl. No.: 13/648,325

(22) Filed: Oct. 10, 2012

(65) Prior Publication Data

US 2014/0097311 A1     Apr. 10, 2014

(51) Int. Cl.
| | |
|---|---|
| *F16M 11/24* | (2006.01) |
| *A47B 9/00* | (2006.01) |
| *A47B 9/14* | (2006.01) |
| *A47B 13/02* | (2006.01) |

(52) U.S. Cl.
CPC .............. *F16M 11/24* (2013.01); *A47B 9/00* (2013.01); *A47B 9/14* (2013.01); *A47B 13/021* (2013.01)

(58) Field of Classification Search
USPC ............... 248/188.1, 188.2, 188.5, 157, 161, 248/354.5, 423; 108/147.13, 147.11
See application file for complete search history.

(56) References Cited

U.S. PATENT DOCUMENTS

| | | | | |
|---|---|---|---|---|
| 3,875,712 | A * | 4/1975 | Thompson | 52/263 |
| 4,423,797 | A * | 1/1984 | Batten | 182/204 |
| 4,926,592 | A * | 5/1990 | Nehls | 52/98 |
| 4,928,446 | A * | 5/1990 | Alexander, Sr. | 52/98 |
| 5,125,194 | A * | 6/1992 | Granger | 52/98 |
| 5,163,373 | A * | 11/1992 | Anderson et al. | 108/158.12 |
| 5,887,842 | A * | 3/1999 | Granger | 248/548 |
| 6,068,233 | A * | 5/2000 | Green | 248/548 |
| 6,196,140 | B1 * | 3/2001 | Newhouse et al. | 108/50.01 |
| 6,233,898 | B1 * | 5/2001 | Burlando | 404/9 |
| 7,309,051 | B2 | 12/2007 | McNeill | |
| 7,866,268 | B2 | 1/2011 | Nagel et al. | |

* cited by examiner

*Primary Examiner* — Monica Millner

(57) ABSTRACT

A height adjustable support for tabletops, chair seats, or like objects, consisting of two parts, a rectangle-shaped component and an L-shaped component. A fixed block at the top of the L-shaped component allows for multiple orientations when the assembly is attached to the underside of a surface. Height adjustability is possible because the rectangle-shaped component has a series of holes bored vertically into the two faces that will contact the interior faces of the L-shaped component. Holes bored through each face of the L-shaped component permit fasteners to pass into the holes in the rectangle-shaped component. When tightened the fasteners will seat against the exterior face of the L-shaped component.

2 Claims, 10 Drawing Sheets

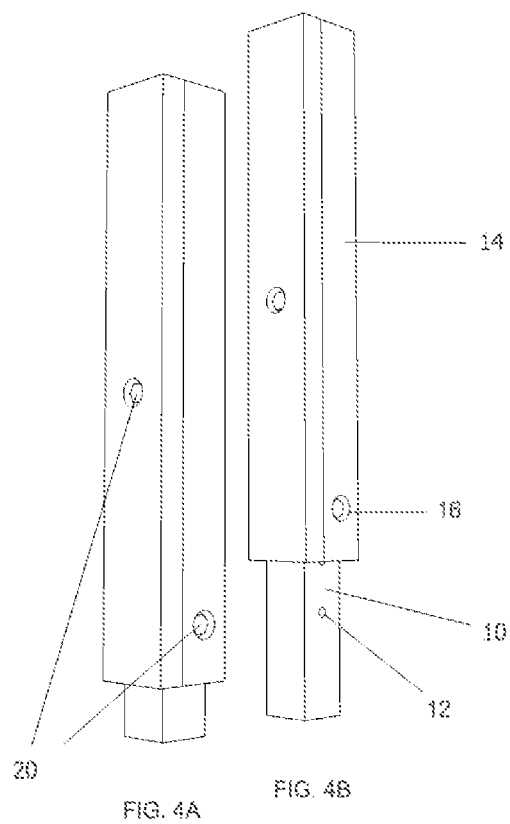

US 9,157,568 B2

HEIGHT ADJUSTABLE SUPPORTS WITH THE CAPACITY FOR MULTIPLE ORIENTATIONS FOR USE WITH TABLETOPS, CHAIR SEATS AND SIMILAR SURFACES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Prior Art

| U.S. Patent | Code | Issue Date | Patentee |
| --- | --- | --- | --- |
| 7,309,051 | B2 | Dec. 18, 2007 | McNeill |
| 7,866,268 | B2 | Jan. 11, 2011 | Nagel et al. |

This proposed embodiment of a height adjustable support, or leg, addresses shortcomings of my own U.S. Pat. No. 7,309,051 (above), which describes a similar device. Several disadvantages of U.S. Pat. No. 7,309,051 are listed below.

(a) The leg assembly is limited to one orientation. This reduces the choices for attaching the leg to a surface.

(b) The T-nut fasteners required are not safe in all environments. There are liabilities when using the supports in a high school setting, or similar surroundings, where individuals are strong and the temptation to tamper with the connections is great.

(c) The price of T-nuts and inserts and the production time required to install the inserts is too high to compete with inferior legs.

(d) The production time required to counter bore the holes in the outer leg is too long to be competitive.

(e) The support cross-members described prevent the surface from being utilized as a desk or similar object.

(f) The assembly is described as having a square outer leg, limiting the potential for other rectangle-shaped configurations for the leg.

BRIEF SUMMARY OF THE INVENTION

One embodiment of a rectangle-shaped height adjustable support, consisting of one fixed and one adjustable component. Wood is the chosen material for this embodiment. Other materials that are suitable for constructing the support are (but not limited to) steel, aluminum and iron. The rectangle-shaped leg is depicted as square for easier viewing. Advantages of this support (especially when compared to the support described in U.S. Pat. No. 7,309,051) are listed below.

(a) This leg can be attached to a table top or similar surface in many orientations. No longer will it be necessary that the L-shaped component be the inner portion of the leg assembly.

(b) Other fasteners will grip as well as or better than T-nuts and won't offer the leverage provided by T-nut handles.

(c) Different fasteners are less expensive and eliminate the production time wasted installing inserts.

(d) The new embodiment will eliminate counter bores in the adjustable component of the assembly. This will reduce production time and enhance the appearance of the support.

(e) The four cross-members can be moved up and attached to both the legs and the underside of the top surface. In the furniture industry these types of cross-members are known as "the apron" of the piece. The elimination of the mid-leg cross-members allows the surface to be used as a desk or similar object.

(f) The embodiment allows for different shaped rectangular legs. This will allow the leg to be adapted to styles that don't employ square legs.

(g) The strength of the connection between the L-shaped component and the rectangle-shaped component will be improved because the fasteners will pass through the thinner L-shaped component into the thicker rectangle-shaped component. The fastener can be longer and with more threads, producing greater gripping power between the two leg components.

BRIEF DESCRIPTION OF THE SEVERAL VIEWS OF THE DRAWING

Studying the following drawings will reveal the superior elements of the leg assembly.

FIG. 4A is a perspective of the assembly fastened in the lowest position of this leg configuration.

FIG. 4B is a perspective of the parts fastened in the highest position.

DETAILED DESCRIPTION OF THE INVENTION

Figure 1:
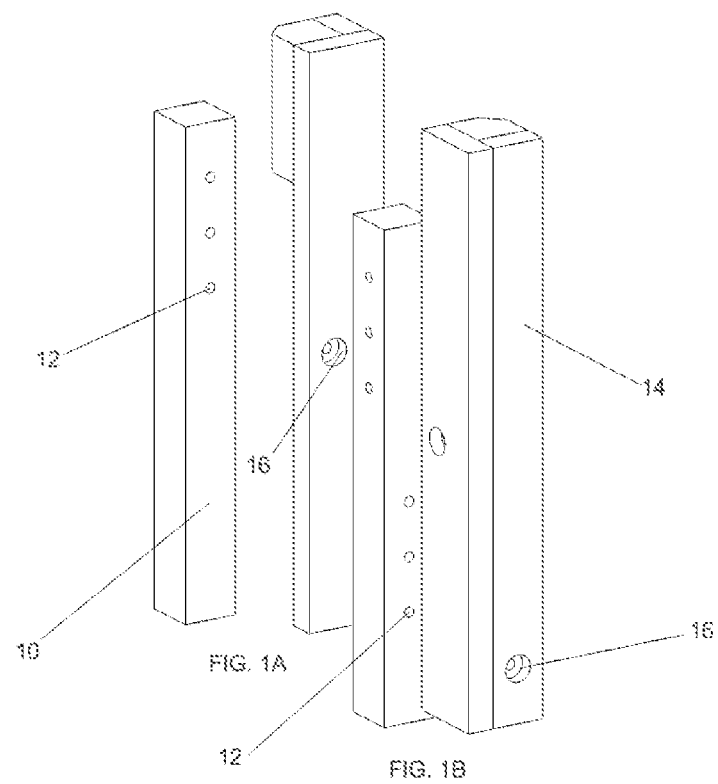
FIG. 1A is a perspective view of the assembly revealing the upper connection positions.
FIG. 1B is a view of the same assembly rotated 90 degrees to show the lower connection positions.

FIGS. 1 to 10 refer to one embodiment of an adjustable height support or leg for tabletops or any objects or surfaces that would benefit from one or more of these supports. The leg consists of two components, an L-shaped part (14) and a rectangle-shaped part (10). The L-shaped part (14) of the leg assembly will be constructed of two pieces of wood that have been dimensioned so that when glued together (perpendicularly) the interior faces will equal the exterior dimensions of the faces of the rectangle-shaped piece (10). One narrow face of one piece of the component (14) should be attached to one wide face of the other piece, so that the pieces form one outer face of the component (14). The L-shaped part (14) of the leg includes a rectangle-shaped block of wood. More options for orienting and mounting the component (14) to a surface and attaching it to an apron (24) are available if the block is included.

The rectangle-shaped block (14) should be fixed at the top of the L-shaped component (14), so that the edges of the top ends meet precisely, creating a flat, rectangular surface. The length and width dimensions of a cross-section of the block attached to the component (14) should match the dimensions of the interior faces of the L-shaped part (14). When joined, the component and the block will form a rectangle based on the dimensions of the exterior faces of the L-shaped component.

The complete component (14), (block and L-shaped component), will be fastened to a surface, becoming the fixed part of the height adjustable leg assembly.

The adjustable component (10) of the leg will share cross-section dimensions with the rectangle-shaped block which has been incorporated into the component (14). In a fully retracted position, the two components (10) and (14) will present a continuous rectangular profile for the length that the components (10) and (14) are in contact. The component (10) can extend beyond the surface shared with the L-shaped component (14) so that it is the only component in contact with a floor. The lengths of components (10) and (14), and the spacing between holes in (10) and (14) can vary, enabling a manufacturer to provide a range of height and adjustability choices.

FIGS. 1A and 1B are two views of the same leg. FIG. 1B has been rotated 90 degrees from the position of FIG. 1A.

FIGS. 1A and 1B depict the component (14) with a portion of the exposed corner of the block relieved at a forty-five degree angle to the adjacent sides. This is an optional step that is recommended when using corner brackets (26) and hanger bolts (28) or similar fasteners for securing the L-shaped leg component (14) to an apron (24). The flat surface created allows a drill to accurately bore a pilot hole at ninety degrees to the surface. The hole will receive a hanger bolt, lag screw or similar fastener used to secure a bracket to the leg. Any upper corner of the component (14) can be trimmed in this manner. The orientation of the support will determine which corner will be relieved.

The previous step is unnecessary if the apron parts are attached to a leg using mortise and tenon (or similar) joinery.

Included in the ensuing paragraphs describing FIGS. 1A and 1B are an explanation of the general locations of holes and the method user to center holes in the surfaces of the components (10)(14). Centering the holes applies even pressure to the faces of the components (10)(14) when the fasteners (20) are tightened. The connection between components (10)(14) will be strongest when centered.

The final paragraphs referring to FIGS. 1A and 1B will describe the required steps to achieve adjustability.

FIG. 1A is a view of the rectangle-shaped component (10) with a series of holes (12) bored into one face. The holes (12) are oriented vertically and are toward the top of the component (10). Each hole (12) must be bored in the center of the face (10). The center is determined by a measurement made at 90 degrees to the two edges of the face (10). It is preferred that the holes (12) do not exit the opposite side of the part (10), leaving the surface smooth and more attractive (some fasteners may require a hole be bored through; for most fasteners this is not necessary). The holes (12) should be bored to a depth that corresponds with the length of the portion of a fastener (20) that will seat within the rectangle-shaped component (10).

In FIG. 1A the L-shaped component (14) is shown with one hole (16) bored into the face. The hole must be bored using a measurement taken from the interior face of the part (14). If the measurement is made across the exterior face of the part (14) the hole (16) will not be centered in the interior surface. The measurement can be obtained using the same method that was used to obtain the center measurements for the holes (12) in part (10). The measurement should be made from the outside edge of an interior face of the part (14), across the face to the bordering interior face of the part (14). This insures the hole (16) will allow a fastener (20) to pass directly into the holes (12) in the component (10) when the two faces of the rectangle-shaped piece (10) are contacting the interior faces of the L-shaped part (14). The hole (16) should be bored at 90 degrees to the interior face of the piece (14). It (16) should enter the interior face of the component (14) and exit the exterior face of the component (14). An optional counter bore is also displayed in the drawing. It is included as a portion of the hole (16). The counter bore (16) provides added protection against tampering when it (16) is made deep enough that the exposed end of a fastener seats below the exterior surface of the component (14).

FIG. 1B has been rotated 90 degrees to the right. This new view reveals the lower holes in the rectangle-shaped component (10) and the lower hole (16) in the L-shaped component (14). The identical procedure of measuring and boring that was used to produce the upper holes in parts (10) and (14) should be used for the lower holes.

Height adjustability requires that minimums of two holes (12) be bored into the two faces of the component (10).

The range of adjustability of this embodiment depends on the height of the individual components (10) and (14) and the placement of the holes (12) and (16). These two factors, when coordinated, determine the lowest and highest settings for the surface needing adjustment.

The height of the part (10) is arrived at by subtracting the height of the block fixed to component (14) and the height of the surface being supported, from the minimum desired height for the surface.

The range of adjustability is determined by the placement of the hole (12) closest to the bottom of the component (10) and the hole (12) in the same series farthest from the bottom of the part (10). After finding the center of the faces (10), measurements reflecting the desired range should be made and marked so that when the two holes (12) (described above) are bored, the center of the drill bit will be on the intersecting marks, insuring accurate distances between each hole. Starting at the bottom of component (10), the same process should be followed when boring the holes (12) in the upper series in the bordering side of the rectangle-shaped leg component (10). The bordering faces of the piece (10) that have been drilled will be the surfaces in contact with the inner faces of the part (14). A small gap must remain between the highest hole (12) of the lower series and the lowest hole of the upper series. This will prevent the two holes (12) from intersecting. If intermediate holes are required the same measuring and marking processes apply.

The total height of the component (14) must include the height of the block affixed at the top of the part (14) plus the height necessary to extend below the lowest hole (12) of the lower series of holes in the part (10). This is necessary for the placement of the lower hole (16). To determine the exact placement of the lower hole (16) a precise measurement must be taken from the top of the component (10) to the mark indicating the center of the lowest hole (12) of the part (10). The identical measurement should be made from the bottom surface of the block of the L-shaped component (14) toward the bottom edges of the component (14). This will insure that the top of the piece (10) will be in contact with the bottom of the block (14) when the assembly is at its lowest setting. Having previously located and marked the center (as measured from the exterior edge of the inner face to the neighboring face) of the interior face of the component (14), the hole (16) can be bored where the two measurements intersect on the part (14). It would be wise to leave an adequate space between the bottom of the part (14) and the hole (16). The space will provide the needed strength for the part (14) to withstand any strong lateral force that might split the part (14) from the hole (16) to the bottom of the component (14). The same method can be applied when determining the placement of the upper hole (16) on the bordering side of the component (14).

The two components can now be fastened together and considered the height adjustable leg assembly. At the assembly's lowest height, one fastener (20) will be placed through the lower hole (16) in the part (14) and tightened into the lowest hole of the lower series of holes (12) in the part (10). The second fastener will be passed through the higher hole (16) in the neighboring face (14) and into the lowest hole of the higher series of holes (12) in the component (10). To adjust the leg assembly to its highest setting remove both fasteners (20) from the holes (12) and (16) and slide the component (10) down the height of the component (14) until the highest holes (12) in the component (10) are visible beneath the holes (16). Insert the fasteners (20) through the holes (16) and tighten the fasteners (20) into the holes (12) of the component (10).

The detailed description of FIGS. 1A and 1B are intended to guide an individual in the making of one leg with simple wood shop equipment. The result is a simple, elegant, height adjustable leg assembly that can be manufactured quickly in large quantities with today's technologies.

Figure 2:
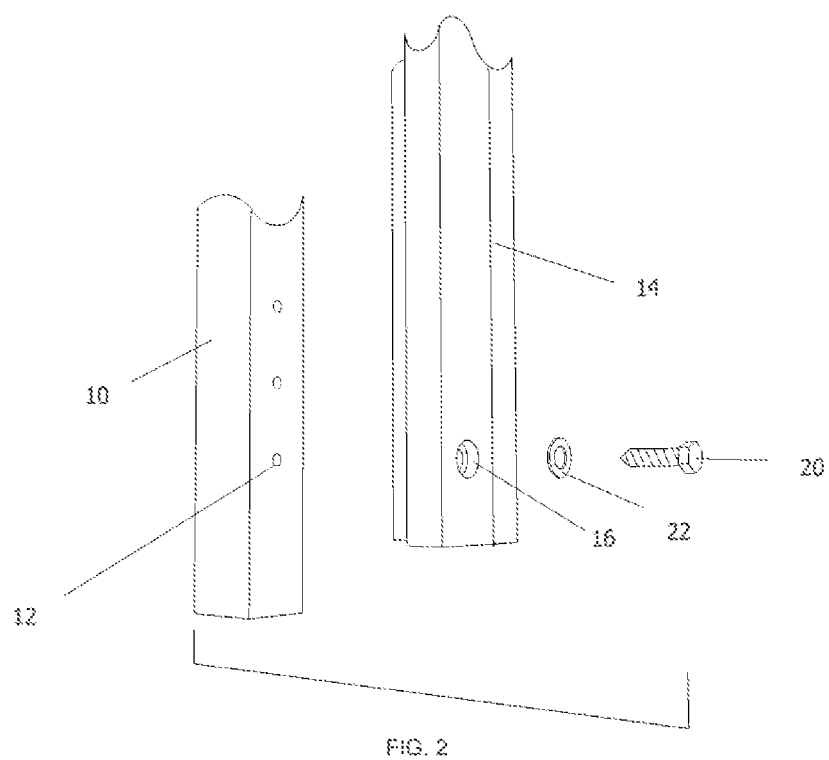
FIG. 2 is a partial illustration showing the lower connection positions (upper connections are identical) and a method for connecting the components.
Figures 3A, 3B, 3C, 3D:
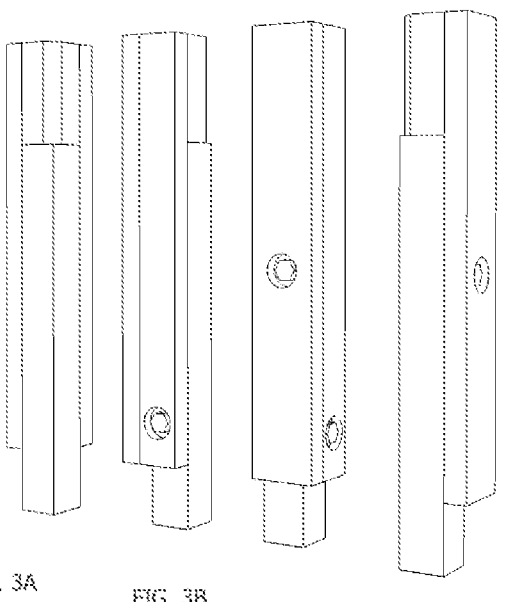
FIGS. 3A to 3D depict four views of the leg, each having been rotated 90 degrees from the previous figure.

FIG. 2 depicts the lower half of the assembly. The lower hole (16) in the part (14) is shown with a counter bore. This is the optional bore mentioned in [039]. It is strongly recommended that the bore be included as an additional measure to protect against tampering. The washer (22) is also optional but it is strongly recommended that it be included when connecting the two components. The washer (22) will protect against wear to the wood fibers on the face of the part (14) when the fastener (20) is firmly tightened into the hole (12) of the component (10).

FIGS. 3A-3D are all views of the same leg assembly adjusted to the assembly's lowest height. The bottoms of the blocks (14) are contacting the tops of the components (10). The fasteners (20) are seated against the washers (22) inside the recessed faces of the counter bores of the holes (16). The fasteners (20) are tightened into the lowest holes of the part (10). At this lowest height, the component (10) extends beyond the bottom of component (14), so that it (10) is the only piece of the support that will contact a floor. It should be emphasized that the height of the components (10) and (14), the distance between holes (12) and (16), and the number of holes in the component (10), all contribute to a wide range of customizable height adjustability.

FIG. 4A is another view of the assembly at its lowest setting. FIG. 4B is the assembly at its highest setting.

Figures 5A, 5B:
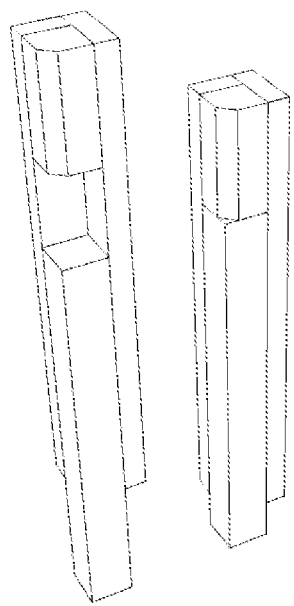
FIGS. 5A and 5B are drawings of the same leg after the leg has been rotated 180 degrees.

FIGS. 5A and 5B are views of the same settings turned 180 degrees from the previous view.

Figure 6:
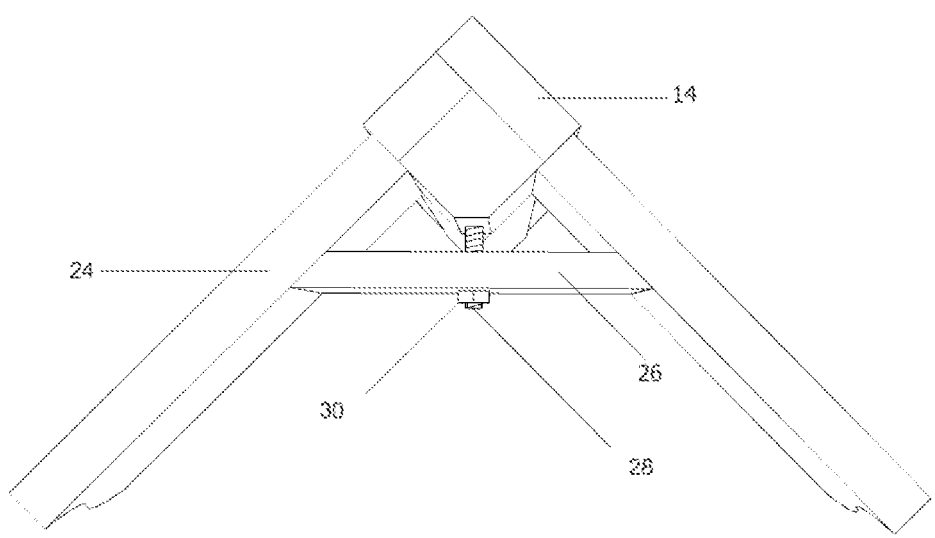
FIG. 6 is a depiction of the leg and a partial view of the apron pieces from the top showing a preferred method of attachment to the cross-members.

FIG. 6 is a partial overhead view of one of the means of fastening the component (14) to the underside of a surface. The corner of the component (14) has been relieved and a hanger bolt (28) has been inserted into a pilot hole in the part (14). A corner bracket (26) with a pre-drilled hole has been placed over the hanger bolt (28) and secured by tightening the nut (30) to the hanger bolt (28). Not visible in this drawing but appearing in FIG. 7 are fours screws (32) that attach the apron pieces (24) to the corner bracket (26).

FIG. 6 shows the leg assembly slightly offset to the apron pieces (24). This is a style choice made possible by the inclusion of the block piece of the component (14). The offset yields an attractive alternative to one continuous face where the outside faces of the leg meet the outside faces of the apron pieces.

Figure 7:
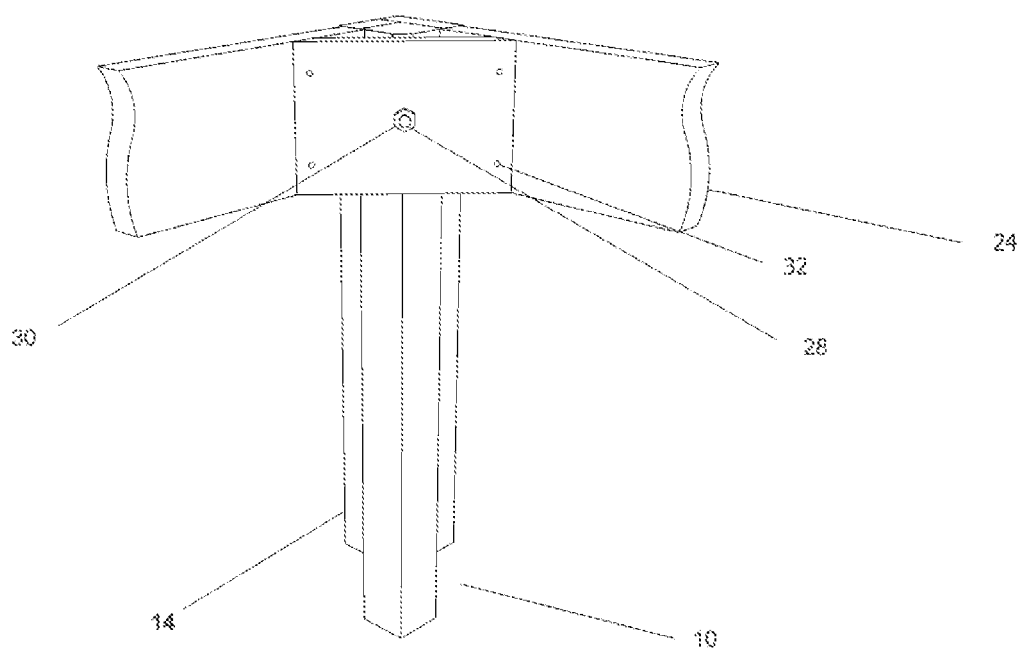
FIG. 7 is a representation of the same connection when viewed at 90 degrees to the bracket.

FIG. 7 is a partial view of the same connection viewed at 90 degrees to the surface of the corner bracket (26). The holes (32) contain screws that are tightened into the apron pieces so that the apron (24), the component (14) and the corner bracket (26) are connected securely together.

Figure 8:
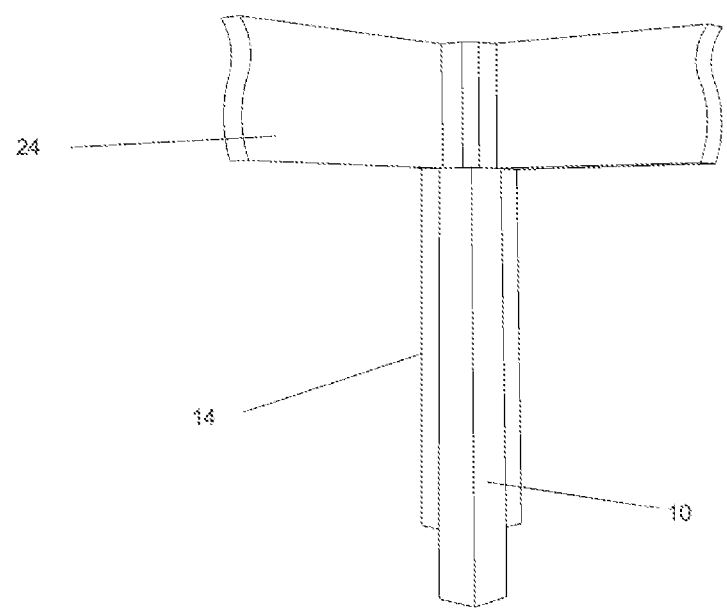
FIG. 8 illustrates a simplified view of the preceding drawing, FIG. 7.

FIG. 8 is a simplified view of FIG. 7. The drawing shows just the leg assembly and portions of the interior faces of the two pieces of the apron (24) that connect to the assembly.

Figure 9:
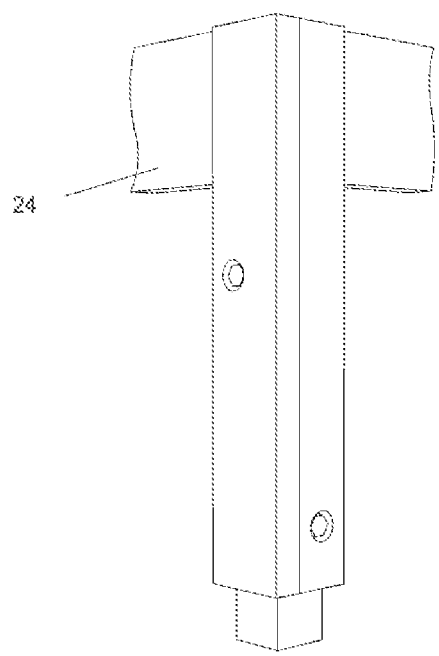
FIG. 9 shows the assembly rotated 180 degrees from the previous drawing.

FIG. 9 shows the same leg assembly and apron pieces (24) turned 180 degrees.

Figure 10:
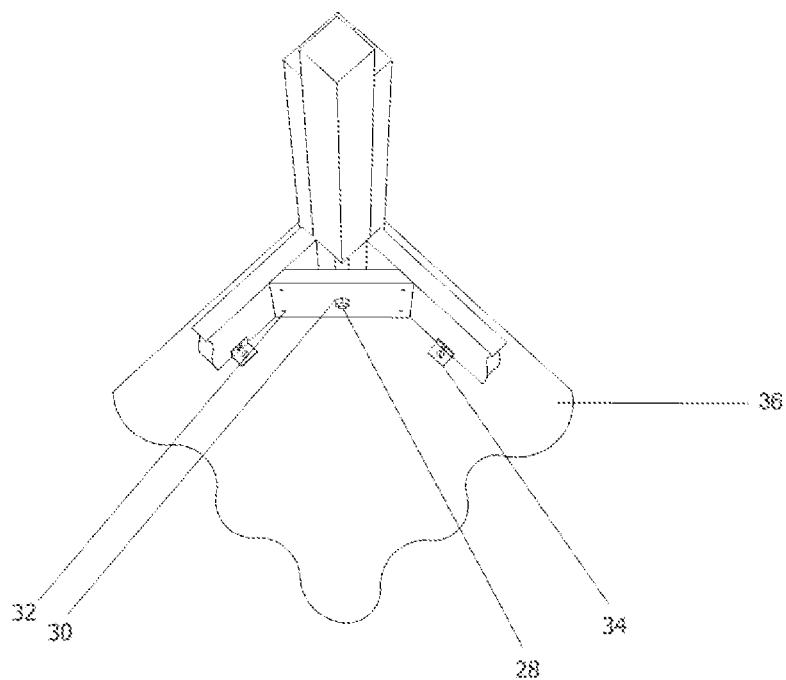
FIG. 10 is a partial view of an underside of a surface which demonstrates one method for integrating the height adjustable leg with all the elements necessary to attach the leg to a tabletop or like surface.

FIG. 10 is a view of a portion of the underside of a surface (36). The height adjustable leg assembly has been secured to the apron (24) with a corner bracket (26). L-shaped brackets (34) have fixed the apron (24) and the component (14) to the surface. This method of connecting the adjustable leg is inexpensive, efficient and strong.

FIGS. 6 to 10 demonstrate how the height adjustable leg assembly (10)(14) will be integrated with a surface. This method is one of many that work with this leg assembly.

The invention claimed is:

1. A leg assembly which provides height adjustments incorporating an inner and an outer leg, and is constructed to allow the leg to be oriented in four directions, the improvement comprising:

the leg assembly including the inner leg that has a rectangle shaped cross-section having two internal faces and two external faces, and the outer leg that has an L-shaped cross-section having two external faces and two internal faces, wherein the internal faces of the inner leg mate with the internal faces of the outer leg, assembled with fasteners; the outer leg includes two holes, one hole to be drilled through each vertical side that is parallel to the internal face of the outer leg, into the internal faces of the inner leg, a vertically aligned series of holes is drilled into each internal face measured to be in sequence with the holes on the adjacent internal face of the inner leg, when the inner leg is moved, the holes in the inner leg will pass directly under the hole drilled in the corresponding side of the outer leg, permitting at least one of the fasteners to be passed through the outer leg and to be fixed into the hole in the internal face of the inner leg that provides the desired height; includes a rectangular block at the top end of the leg, a top surface of the block is flush with a top edge of the outer leg, a bottom surface of the block is flush to a top surface of the inner leg when the inner leg is fully retracted; exterior sides of the block are flush to vertical edges of the outer leg; cross-members are attached to the outer leg so that a top edge of the cross-members is flush to a top surface of the outer legs, the inner and outer legs and cross-members are in a single plane; the underside of a support surface contacts along the entire top edge of the leg assembly and cross-members; so that the support surface lays flat on the leg assembly.

2. The leg assembly of claim 1, wherein the cross-members are attached at lower points on the outer legs to increase lateral strength.

\* \* \* \* \*